Patented Sept. 1, 1936

2,052,586

UNITED STATES PATENT OFFICE 2,052,586

AMINE SALTS OF AROMATIC SULPHONIC ACIDS

George R. Tucker, North Andover, Mass., assignor to Dewey and Almy Chemical Company, North Cambridge, Mass., a corporation of Massachusetts No Drawing. Application July 3, 1933, Serial No. 679,004

7 Claims. (Cl. 260—129)

This invention relates to new naphthalene derivatives and particularly to the class of compounds prepared by neutralizing either mono- or further substituted sulphonic acids with hydroxy-alkyl amines. Such compounds find special use as addition agents in hydraulic cement.

One class of compounds (so classified because it is particularly valuable for the manufacture of cellular concrete products) may be prepared by condensing aliphatic alcohols such as iso-propyl or n-butyl alcohol with a naphthalene sulphonic in the presence of a suitable dehydrating agent.

Members of the second group, serviceable to improve the plasticity of the wet concrete and the strength of hardened concrete may be prepared by condensing an aromatic sulphonic acid with formaldehyde or its equivalent and are believed to be sulphonic acids of polymerized hydrocarbons or derivatives thereof having two or more aromatic nuclei joined to a methylene group or a single carbon atom.

It is the purpose of this invention to produce hydroxy-alkyl amine salts of the above compounds. Hydroxyalkylamine salts of sulphonic acids chosen from either of the described groups may be made by neutralizing the chosen acid either partially or completely with the hydroxyalkylamine.

The preferred control is to titrate a sample of the pure naphthalene sulphonic acid from either of the above groups with sodium hydroxide until it is just blue to litmus and therefrom to obtain the factor for the hydroxyalkylamine, for example, triethanol amine.

Since the molecules of the formaldehyde condensed sulphonic acids always contain at least two SO₃—H groups, a series of salts may be formed from these acids by the substitution of one or more of the replaceable hydrogen atoms. In the simplest instance, one half of the amount of the hydroxy-alkyl amine required to neutralize completely the sulphonic acid may be added, thus producing the acid salt. Again 1 mol. of sodium hydroxide or other suitable alkali and 1 mol. of the hydroxy-alkyl-amine may be added, forming a sodium amine salt, or the replaceable hyrogen atoms may be completely replaced by the amine alone.

Empirical examples follow.

Example 1

To the quantity of a given pure condensed sulphonic acid from 1000 lbs. naphthalene prepared as set forth in my application for U. S. patent, Serial No. 643,741, filed November 21, 1932, add pure triethanolamine or a lesser quantity of the commercial grade of triethanolamine to complete neutralization.

Example 2

To a given quantity of n-butyl naphthalene sulphonic acid add pure triethanolamine or a lesser quantity of the commercial product to complete neutralization.

Example 3

To a given quantity of iso-propyl naphthalene sulphonic acid add pure triethanolamine or a lesser quantity of the commercial product.

Example 4

To a given quantity of the pure condensed sulphonic acid from naphthalene prepared as set forth in my application for U. S. patent, Serial No. 643,741, filed November 21, 1932, add an amount of triethanolamine to replace the hydrogen in substantially one-half of the sulphonic acid groups and an amount of sodium hydroxide or an equivalent quantity of other alkali to replace the hydrogen in the remaining sulphonic acid. The solutions may be evaporated to give the dry salts—or used in water solution.

In place of naphthalene in the foregoing sulphonation and condensation procedure may be employed any aromatic hydrocarbon such as benzene, diphenyl, anthracene, phenanthrene, fluorene, etc., or any homologue or derivative thereof, as set forth in my aforesaid application.

I claim:

1. A hydroxy-alkyl amine salt of a lower alkylated naphthalene sulphonic acid.

2. A hydroxy-alkyl amine salt of the formaldehyde condensation product of an aromatic sulphonic acid.

3. A triethanolamine salt of the formaldehyde condensation product of beta naphthalene sulphonic acid.

4. A salt having the general formula R—SO₃X in which R indicates a naphthalene group and X an alkylol amine.

5. A salt having the general formula

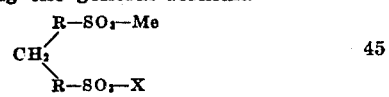

R indicates a naphthalene radical, Me an alkali or alkaline earth metal, X an alkylol amine.

6. A salt having the general formula

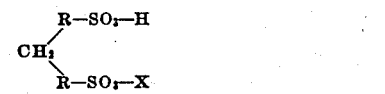

R indicates a naphthalene radical, and X an alkylol amine.

7. A salt having the general formula R—SO₃X in which R indicates an aromatic group and X an alkylol amine.

GEORGE R. TUCKER.